(12) United States Patent
Itoh et al.

(10) Patent No.: US 9,750,182 B2
(45) Date of Patent: Sep. 5, 2017

(54) GRASS CUTTER

(71) Applicant: IDECH CORPORATION, Kasai-shi, Hyogo (JP)

(72) Inventors: Junya Itoh, Kasai (JP); Kazuyuki Kishimoto, Hyogo (JP)

(73) Assignee: Idech Corporation (JP)

( * ) Notice: Subject to any disclaimer, the term of this patent is extended or adjusted under 35 U.S.C. 154(b) by 0 days.

(21) Appl. No.: 14/970,776

(22) Filed: Dec. 16, 2015

(65) Prior Publication Data

US 2016/0249527 A1    Sep. 1, 2016

(30) Foreign Application Priority Data

Feb. 27, 2015  (JP) ................... 2015-038553

(51) Int. Cl.
| | |
|---|---|
| *A01D 34/68* | (2006.01) |
| *A01D 34/90* | (2006.01) |
| *A01D 34/835* | (2006.01) |
| *A01D 34/685* | (2006.01) |
| *A01D 34/76* | (2006.01) |
| *A01D 69/06* | (2006.01) |

(52) U.S. Cl.
CPC ....... *A01D 34/6812* (2013.01); *A01D 34/685* (2013.01); *A01D 34/76* (2013.01); *A01D 34/8355* (2013.01); *A01D 34/90* (2013.01); *A01D 69/06* (2013.01)

(58) Field of Classification Search
CPC .. A01D 34/6812; A01D 34/685; A01D 34/76; A01D 34/8355; A01D 34/90; A01D 69/06

USPC .................................................. 30/206, 276
See application file for complete search history.

(56) References Cited

U.S. PATENT DOCUMENTS

| | | | | |
|---|---|---|---|---|
| 2,953,852 A | * | 9/1960 | Dehn ................. | A01D 1/06 172/13 |
| 4,827,616 A | * | 5/1989 | Sistare .................. | A01G 3/053 30/210 |
| 5,174,099 A | * | 12/1992 | Matsuura .............. | A01D 34/76 30/276 |
| 5,402,576 A | * | 4/1995 | Kiyooka ............... | A01D 34/63 30/216 |

(Continued)

FOREIGN PATENT DOCUMENTS

| | | | |
|---|---|---|---|
| GB | 2535829 A | * | 8/2016 |
| JP | 11-253027 A | | 9/1999 |

(Continued)

OTHER PUBLICATIONS

Search Report issued May 25, 2016, in UK Patent Application No. GB1521338.2.

*Primary Examiner* — Hwei C Payer
(74) *Attorney, Agent, or Firm* — Wood, Phillips, Katz, Clark & Mortimer

(57) ABSTRACT

A body unit of a grass cutter incorporates a deceleration mechanism unit. The deceleration mechanism unit has a ring gear-side member, a sun gear-side member, a retainer board member, and a small gear. Eleven rollers mounted on the retainer board member are each provided in a gap between a ring gear-side guide and a sun gear-side guide, and engagement portions of the rollers are in contact with both the ring gear-side guide and the sun gear-side guide. The small gear engages with both a ring gear and a sun gear.

18 Claims, 9 Drawing Sheets

(56) References Cited

U.S. PATENT DOCUMENTS

| | | |
|---|---|---|
| 6,105,351 A | 8/2000 | Itoh |
| 2012/0073257 A1 | 3/2012 | Pellenc et al. |
| 2016/0249527 A1* | 9/2016 | Itoh .................... A01D 34/6812 30/206 |

FOREIGN PATENT DOCUMENTS

| | | |
|---|---|---|
| JP | 2000-217411 A | 8/2000 |
| KR | 2013-0044064 A | 5/2013 |

* cited by examiner

GRASS CUTTER

TECHNICAL FIELD

The present invention relates to grass cutters using an engine or a motor as a power source. The present invention more particularly relates to a grass cutter of a type having two or more blade plates that are relatively rotated at low speed to catch and cut plants with cutting blades projecting from outer peripheral portions of the respective blade plates.

BACKGROUND ART

Conventional grass cutters are mainly configured to have only one circular saw-like rotary blade which is rotated at high speed and pressed against plants to cut the plants away. Although the grass cutters of this type have a high grass cutting efficiency, grass cutting operation involves some danger as rotary teeth of the grass cutters may break, and broken pieces may fly and hit against people.

As a solution to this problem, a two-blade grass cutter has been proposed. The two-blade grass cutter has an upper blade plate and a lower blade plate. Both the upper blade plate and the lower blade plate have a disc-like shape and have a plurality of cutting blades projecting from their outer peripheral portions. The two-blade grass cutter incorporates a deceleration mechanism used to decelerate a turning effect of a motor or an engine so as to slowly rotate the upper blade plate and the lower blade plate in directions opposite to each other. Plants are cut between the cutting edges of the upper blade plate and the lower blade plate. Since the blade plates of the two-blade grass cutter slowly rotate, there is no concern for broken pieces of the blades flying away.

Japanese Patent Laid-Open No. 11-253027 discloses a grass cutter including a deceleration mechanism using a planetary gear train. The grass cutter has a sun gear including a lower blade plate and a ring gear including an upper blade plate, with a plurality of small gears being interposed between the sun gear and the ring gear to constitute a planetary gear train. More specifically, the sun gear and the ring gear are concentrically arranged with a gap present between an external gear provided in an outer peripheral portion of the sun gear and an internal gear provided in an inner periphery of the ring gear. The small gears arranged in the gap are configured to engage with both of the sun gear and the ring gear. The grass cutter has a plurality of small gears disposed at equal intervals on a circle.

The grass cutter maintains relative positional relationship between the sun gear and the ring gear with the presence of the plurality of small gears interposed therebetween. More specifically, the grass cutter has the plurality of small gears held between the sun gear and the ring gear to secure a distance between the sun gear and the ring gear. That is, the grass cutter is configured to have the plurality of small gears around the sun gear and to have the ring gear around the plurality of small gears, so that the sun gear and the ring gear are in concentric positional relationship.

DISCLOSURE OF INVENTION

Technical Problem

The grass cutter disclosed in Japanese Patent Laid-Open No. 11-253027 has high safety since the upper blade plate and the lower blade plate slowly rotate. However, the grass cutter had a room for improvement in terms of durability. That is, the two-blade grass cutter has mainly been used for domestic use since the past. However, in recent years, as the high safety of the two-blade grass cutter attracts attention, the two-blade grass cutter is also being used for business use.

Accordingly, the two-blade grass cutter is being required to have durability high enough for business use. When the grass cutter disclosed in Japanese Patent Laid-Open No. 11-253027 is used with high frequency in a heavy load state, backlash may be generated in the planetary gear train. In this grass cutter, the lower blade plate is provided in the sun gear, and the upper blade plate is provided in the ring gear. In the grass cutting operation, the lower blade plate and the upper blade plate are pressed against plants.

As described before, in this grass cutter, the relative positional relationship between the sun gear and the ring gear is maintained by the presence of the plurality of small gears interposed therebetween. More specifically, the grass cutter has the plurality of small gears held between the sun gear and the ring gear to secure the positional relationship between the sun gear and the ring gear. Therefore, as the sun gear, the ring gear, and the small gears are worn out due to long use, gaps between each of the sun gear, the ring gear, and the small gears are enlarged.

Accordingly, when the grass cutter is used with high frequency in the heavy load state, backlash may be generated in the planetary gear train. There is also a concern that the respective gears are out of normal engagement as the gears are worn out. If only the upper blade plate is pressed against plants during the use of the grass cutter, a thrust load is applied only to the ring gear that is fixed to the upper blade plate, which generates eccentric force that makes the ring gear eccentric to the sun gear. This also applies to the case where only the lower blade plate is pressed against plants. A thrust load is applied only to the sun gear that is fixed to the lower blade plate, which generates eccentric force that makes the sun gear eccentric to the ring gear. As a result, the centers of the ring gear and the sun gear are out of alignment, which causes tooth skipping and hinders normal rotation of the blade plates.

An object of the present invention is to improve the grass cutter disclosed in Japanese Patent Laid-Open No. 11-253027 to provide a grass cutter with high durability.

Solution to Problem

An aspect to accomplish the above-stated object includes two or more coaxially disposed blade plates each having a plurality of cutting blades projecting from an outer peripheral portion thereof, a power source, and a deceleration mechanism that decelerates power of the power source to rotate at least one of the blade plates to catch plants between the cutting blades of the two blade plates and to cut the plants with the cutting blades, wherein the deceleration mechanism includes a sun gear-side member, a ring gear-side member, and at least one small gear, the sun gear-side member comprising a sun gear with a gear formed on an outer peripheral portion thereof, and a sun gear-side guide provided coaxially with the sun gear, the ring gear-side member comprising a ring gear with a gear formed on an inner peripheral side thereof, and a ring gear-side guide provided coaxially with the ring gear, wherein the sun gear-side guide engages with the ring gear-side guide directly or through another member so as to prevent the sun gear and the ring gear from relatively moving in a radial direction, and wherein the at least one small gear is present between the sun gear and the ring gear, the at least one small gear engaging with both of the sun gear and the ring gear to receive the power of the power source transmitted thereto.

The grass cutter of the present aspect includes, in addition to gears constituting a planetary gear train, a structure for preventing the sun gear and the ring gear from relatively moving in the radial direction. That is, in the grass cutter of the present aspect, the sun gear-side member has a sun gear-side guide provided coaxially with the sun gear. The ring gear-side member has a ring gear-side guide provided coaxially with the ring gear.

In the present aspect, the sun gear-side guide engages with the ring gear-side guide directly or through another member so as to prevent the sun gear and the ring gear from relatively moving in the radial direction. Accordingly, in the grass cutter of the present aspect, even when gears are worn out as a result of long use and a clearance between the gears increases, the engagement relationship between the sun gear-side guide and the ring gear-side guide ensures normal positional relationship between the sun gear and the ring gear. Accordingly, even when the gears are worn out, the sun gear, the ring gear, and the small gear can normally engage with each other to transmit power.

In the above aspect, the ring gear-side guide may preferably be a circular opening formed in a member, the circular opening having a first arc-like portion provided on an inner periphery thereof;

the sun gear-side guide may preferably be an outer periphery of a circular member, the outer periphery having a second arc-like portion;

the first arc-like portion may preferably have an inner diameter larger than an external diameter of the second arc-like portion;

the sun gear-side guide may preferably be inside the ring gear-side guide, with the second arc-like portion being disposed concentrically with the first arc-like portion; and the first arc-like portion and the second arc-like portion may preferably be provided with a roller interposed therebetween.

In the grass cutter of the present aspect, the sun gear-side guide and the ring gear-side guide engage with each other through the rollers. Accordingly, frictional resistance between the sun gear-side guide and the ring gear-side guide is small, so that less power is lost.

In each of the above-mentioned aspects, the ring gear-side guide may preferably be a circular opening formed in a member, the circular opening having an inner diameter smaller than an addendum circle diameter of the ring gear;

the sun gear-side guide may preferably be an outer periphery of a circular member, the outer periphery having an external diameter larger than the sun gear; and the sun gear-side guide and the ring gear-side guide may preferably be provided with a rotor interposed therebetween.

In each of the above-mentioned aspects, the grass cutter may preferably further include a plate-shaped or ring-shaped retainer board, wherein a plurality of rollers or rotors may be provided between the sun gear-side guide and the ring gear-side guide, and wherein the plurality of rollers or rotors, and the at least one small gear may preferably be supported by or mounted on the retainer board.

According to the present aspect, the relative positional relationship among each of the rollers or rotors, and the small gear is secured.

In each of the above-mentioned aspects, the grass cutter may preferably further include a handle, and a body unit comprising the blade plates and the deceleration mechanism, the body unit further comprising a plate-shaped or ring-shaped retainer board, and an unmovable member unmovable relative to the handle;

wherein a plurality of rollers or rotors each having a through hole may be provided between the sun gear-side guide and the ring gear-side guide, wherein a plurality of pins may be inserted between the unmovable member and the retainer board, and wherein the rollers or rotors may be rotatably supported by or mounted on the retainer board while the pins are inserted into the through holes of the rollers or rotors.

In each of the above-mentioned aspects, both of the sun gear and the ring gear may preferably be plate-shaped, the small gear receiving the power of the power source transmitted thereto may preferably have a thickness more than twice as large as those of the sun gear and the ring gear, only a region near axial one end of the small gear may preferably engage with the sun gear and the ring gear when the small gear engages with the sun gear and the ring gear, and top and bottom sides of the small gear may preferably be reversible and the region of the small gear engaging with the sun gear and the ring gear may preferably be changeable by reversing the top and bottom sides of the small gear according to the necessity.

By the empirical rule, the small gear that receives the power of the power source transmitted thereto is considerably worn out as compared with other gears. Accordingly, using the grass cutter over a long period of time requires periodical replacement of the small gear that receives the power of the power source transmitted thereto. However, a plurality of small gears purchased as replacement parts may go missing while they are stored. It is also troublesome to purchase the small gears every time they need to be replaced. Accordingly, in the present aspect, the small gears are thickened and only a region near axial one end of each gear is used for a first fixed period of time. More specifically, only the region near axial one end is engaged with the sun gear and the ring gear for the first fixed period of time. As the small gear is worn out, the top and bottom directions of the small gear are reversed so that a region of the small gear unused for power transmission is engaged with the sun gear and the ring gear. According to the present aspect, the life of the small gear can be doubled.

In each of the above-mentioned aspects, the ring gear may preferably include a first base material portion and a first tooth portion provided on an inner peripheral side of the first base material portion whereas the sun gear may preferably include a second base material portion and a second tooth portion provided on an outer peripheral side of the second base material portion;

at least one of the first base material portion of the ring gear and the second base material portion of the sun gear may preferably have a seal packing, the seal packing being integrally fixed at least in a radial direction of the gear;

part of the seal packing may preferably be in contact with another member to constitute a water sealing structure, the another member having an engagement portion; and the seal packing may preferably engage with the engagement portion of the another member so as to be able to support a radial direction load of the sun gear and/or the ring gear.

In the grass cutter of the present aspect, the radial direction load of the sun gear and/or the ring gear may also be supported by the seal packing. Accordingly, in the grass cutter of the present aspect, the seal packing also contributes to maintaining the positional relationship between the sun gear and the ring gear.

Further in each of the above-mentioned aspects, the ring gear may preferably include a first base material portion and a first tooth portion provided on an inner peripheral side of the first base material portion whereas the sun gear may preferably include a second base material portion and a second tooth portion provided on an outer peripheral side of the second base material portion;

at least one of a plate-shaped part of the sun gear and a plate-shaped part of the ring gear may preferably have a seal packing, the seal packing being integrally fixed at least in an axial direction of the gear;

part of the seal packing may preferably be in contact with another member to constitute a water sealing structure, the another member having an engagement portion; and the seal packing may preferably engage with the engagement portion of the another member so as to be able to support a thrust direction load of the sun gear and/or the ring gear.

In the grass cutter of the present aspect, the thrust direction load of the sun gear and/or the ring gear may also be supported by the seal packing. Accordingly, in the grass cutter of the present aspect, the seal packing also contributes to maintaining the positional relationship between the sun gear and the ring gear.

Effect of Invention

The grass cutter of the present invention has high durability as it can keep gears in engagement even when the gears have slight wear.

MODE FOR CARRYING OUT THE INVENTION

Figure 1:
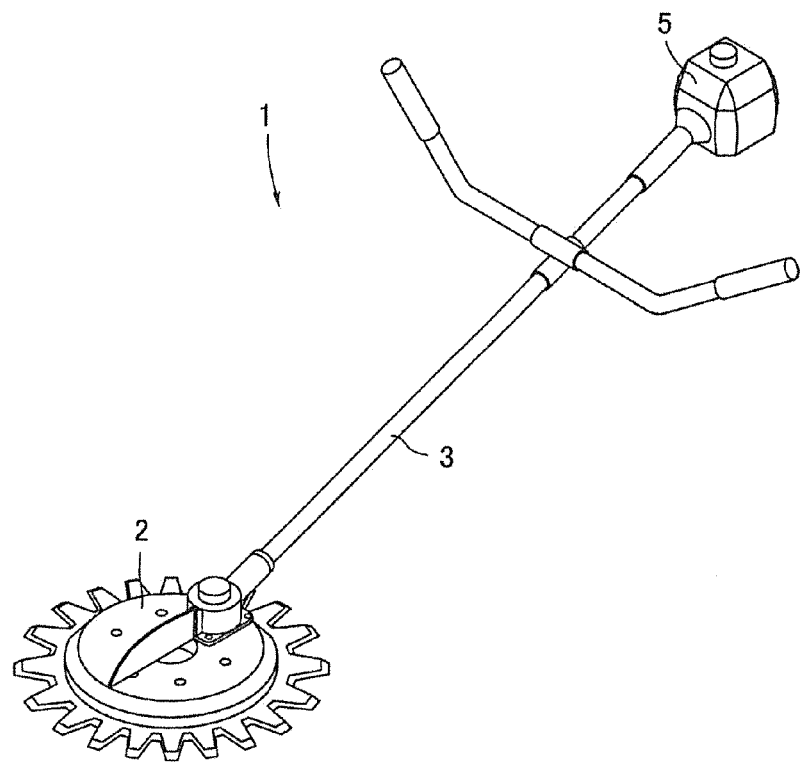
FIG. 1 is a perspective view of a grass cutter of an embodiment of the present invention.
Figure 2:
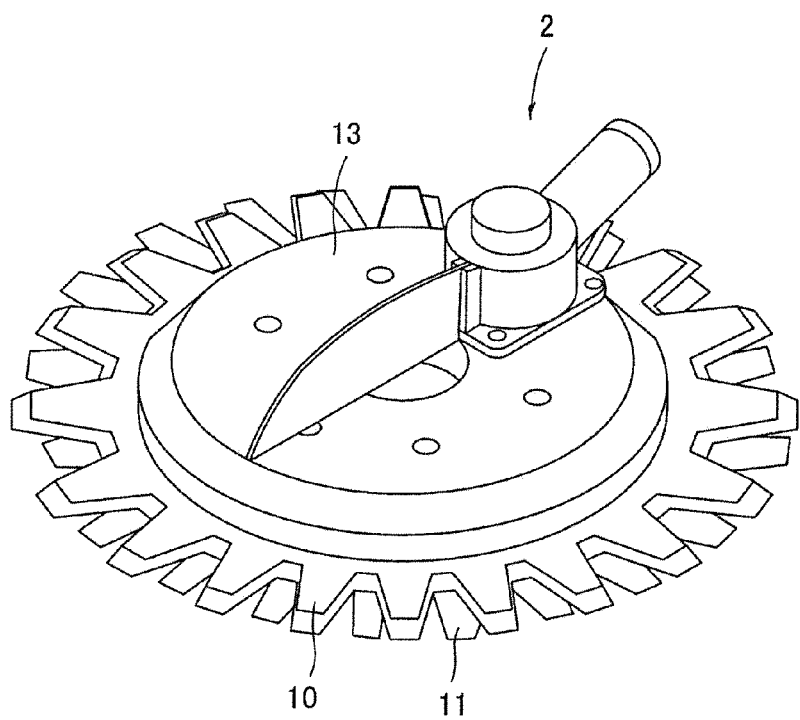
FIG. 2 is a perspective view of a body unit of the grass cutter of FIG. 1.
Figure 3:
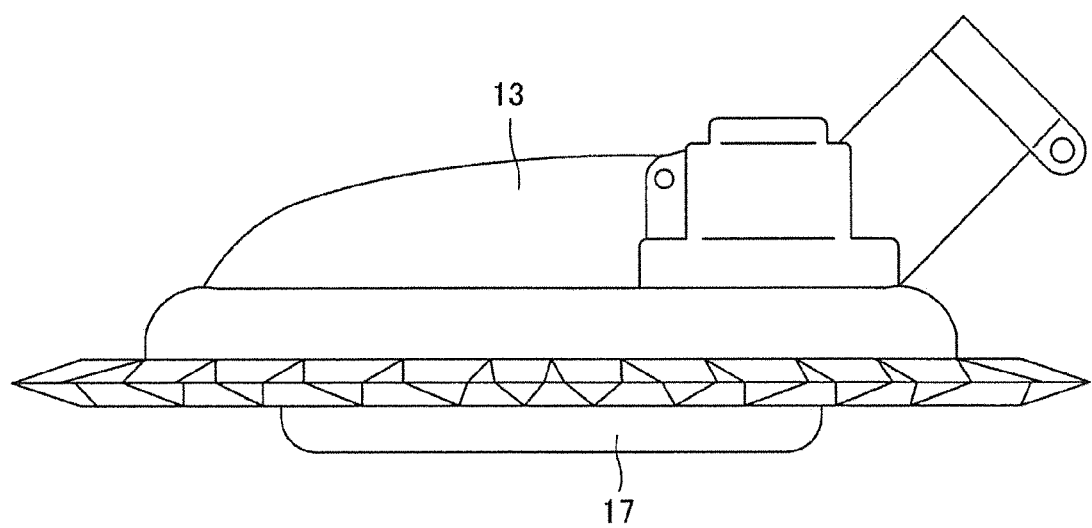
FIG. 3 is a side view of the body unit of the grass cutter of FIG. 1.

Hereinbelow, embodiments of the present invention will further be described. A grass cutter 1 of the present embodiment is a two-blade grass cutter. The grass cutter 1 includes a body unit 2, a handle 3, and a power source 5 as in the case of publicly known grass cutters. The handle 3 is a hollow pipe as publicly known, with a drive shaft (not illustrated) being inserted therein. The power source 5 is a motor or an engine. The grass cutter 1 includes the body unit 2 mounted on a top end of the handle 3 and the power source 5 mounted on a rear end portion thereof. A turning effect of the power source 5 is transmitted to the body unit 2 through the un-illustrated drive shaft to rotate an upper blade plate 10 and a lower blade plate 11 of the body unit 2 in directions opposite to each other.

Figure 4:
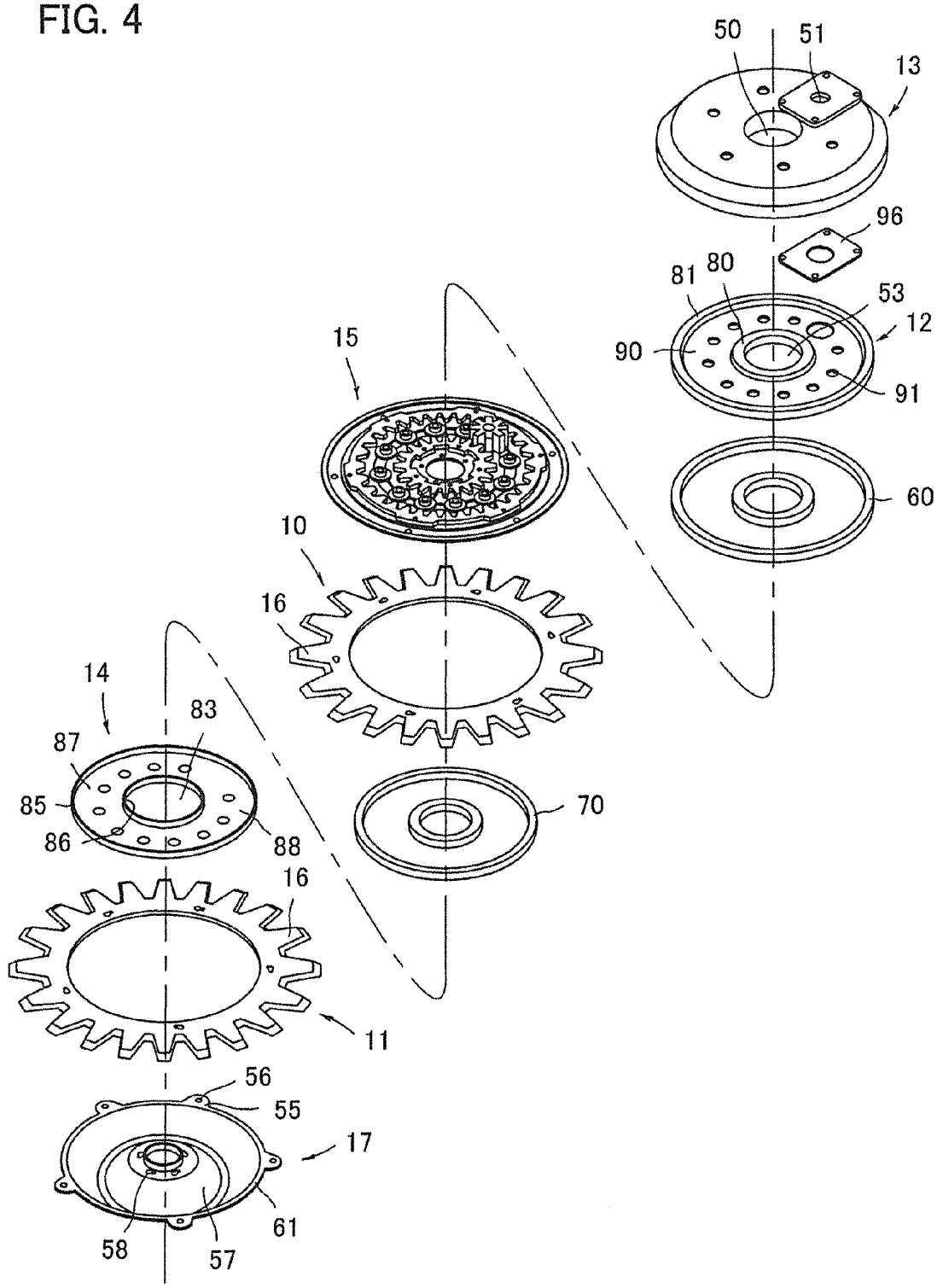
FIG. 4 is an exploded perspective view illustrating the body unit of the grass cutter of FIG. 1 broken into an upper cover member, an intermediate plate member, a deceleration mechanism unit, a lower cover member, an upper blade plate, and a lower blade plate.

The body unit 2 of the grass cutter 1 includes, as illustrated in FIG. 4, an upper cover member 13, an upper-side intermediate plate member 12, a deceleration mechanism unit 15, a lower-side intermediate plate member 14, a lower cover member 17, an upper blade plate 10, and a lower blade plate 11. The upper blade plate 10 and the lower blade plate 11 are the same as publicly known plates, which are disc-like plates having cutting blades 16 provided around the plates at equal intervals. Each of the cutting blades 16 is in a trapezoidal shape, with cutting edges formed on a side corresponding to one oblique side.

The deceleration mechanism unit 15 incorporates a kind of planetary gear train. The deceleration mechanism unit 15 may further be broken into a ring gear-side member 20, a sun gear-side member 21, a retainer board member 22, and a small gear 23 as illustrated in FIG. 6. The ring gear-side member 20, the sun gear-side member 21, and the retainer board member 22 may be broken into smaller components as illustrated in FIG. 5.

Figure 5:
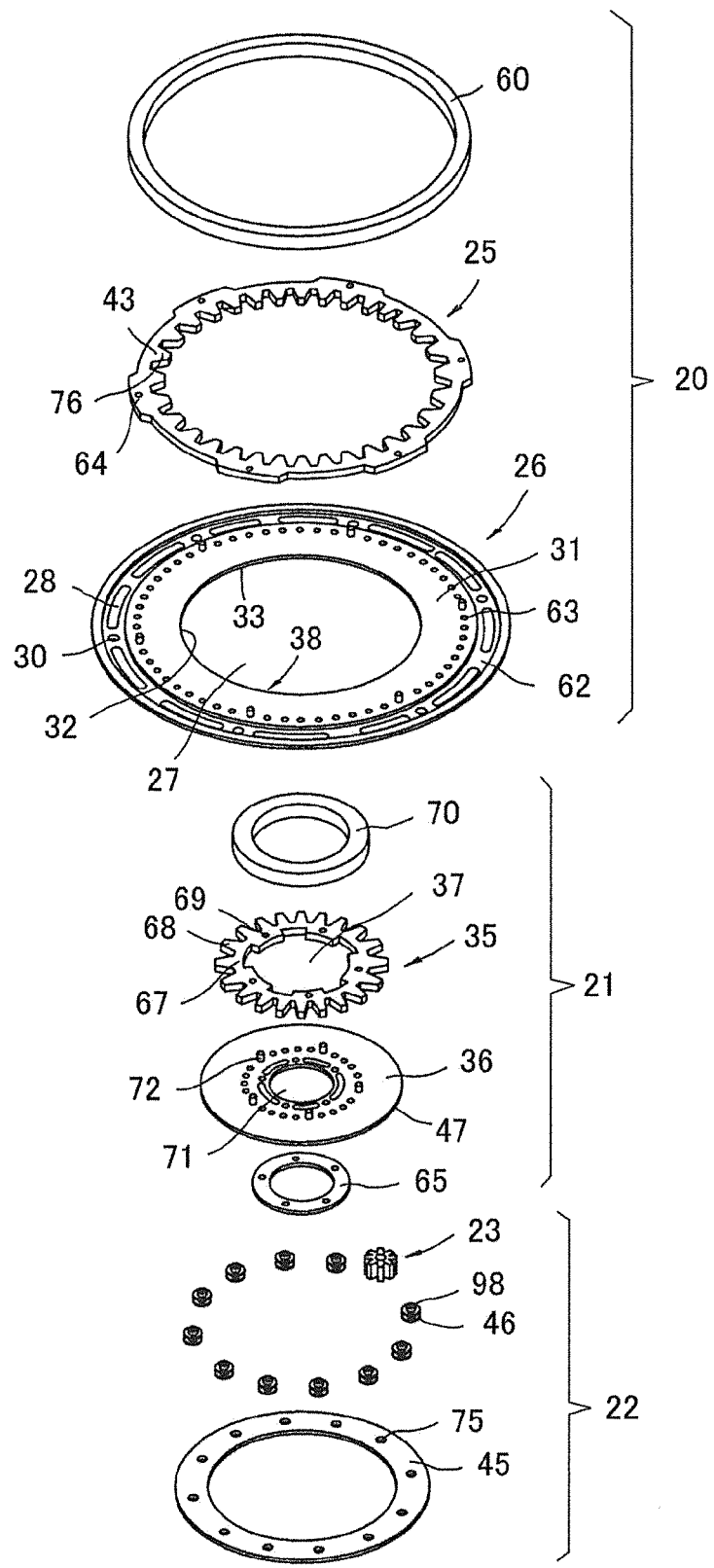
FIG. 5 is an exploded perspective view illustrating the deceleration mechanism unit of FIG. 4 broken into respective components.
Figure 6:
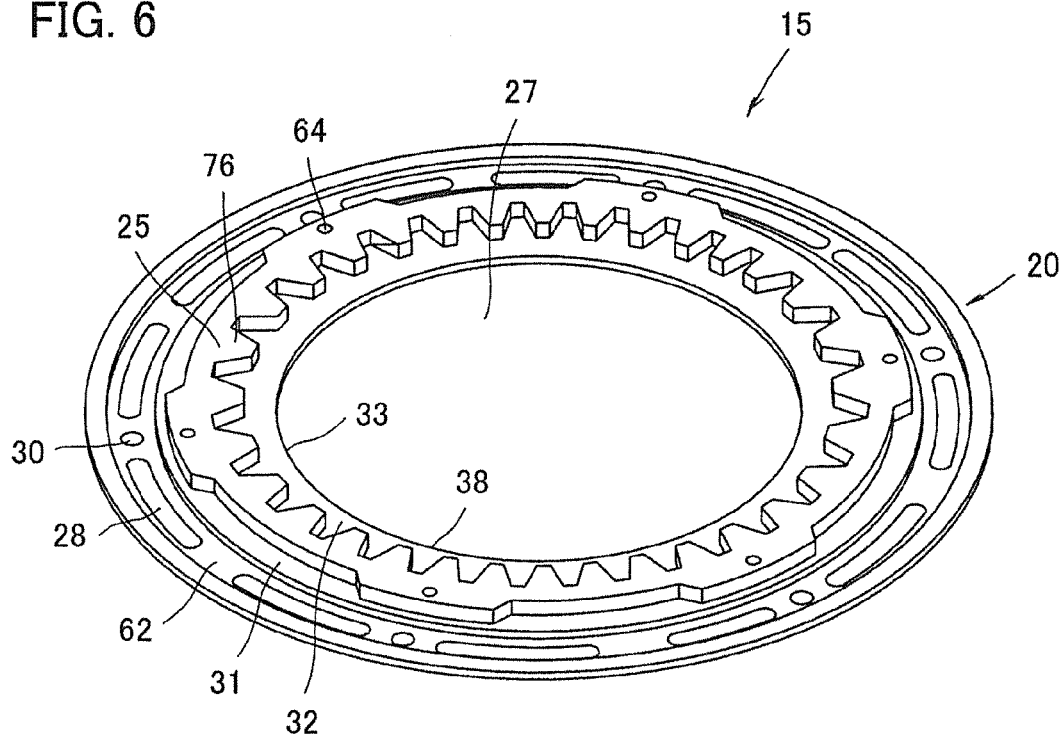
FIG. 6 is an exploded perspective view illustrating the deceleration mechanism unit of FIG. 4 broken into a sun gear-side member, a ring gear-side member, and a retainer board member.
Figure 6:
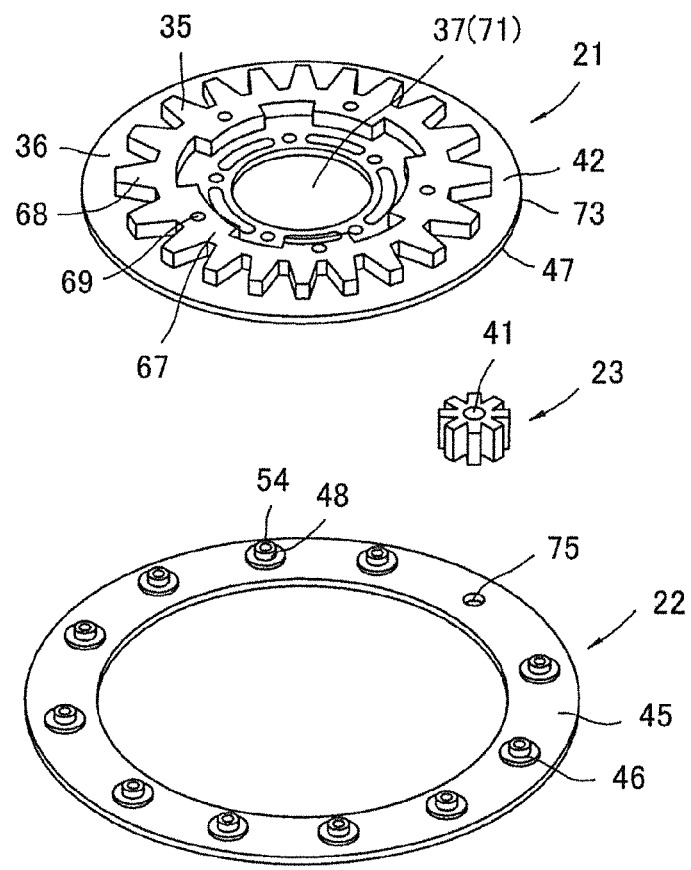

The ring gear-side member 20 includes a ring gear 25 and a ring gear flange 26 as illustrated in FIG. 5. The ring gear 25 is a thin internal gear. The ring gear 25 has a plate-like ring-shaped base material portion (first base material portion) 43 having an opening, with a tooth portion (first tooth portion) 76 being provided on an inner peripheral base end portion of the base material portion 43. In the present embodiment, the base material portion 43 of the ring gear 25 is provided with a seal packing 60. The seal packing 60 is provided in a region of the ring gear 25 which is not the tooth portion 76. The seal packing 60 is integrally fixed to the ring gear 25 with un-illustrated adhesive bonds and the like. The base material portion 43 of the ring gear 25 has holes 64 provided for fixing the ring gear 25 to the ring gear flange 26.

Figure 7:
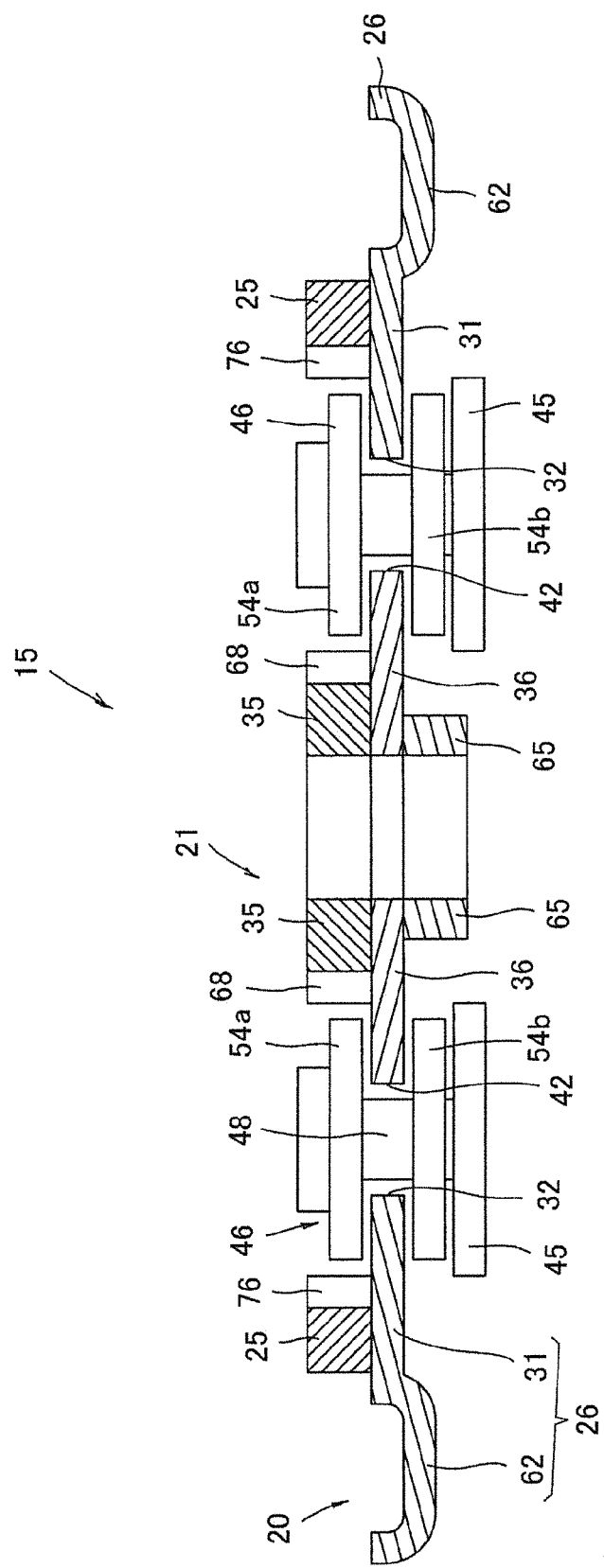
FIG. 7 is a cross sectional view of the deceleration mechanism unit of FIG. 4.
Figure 8:
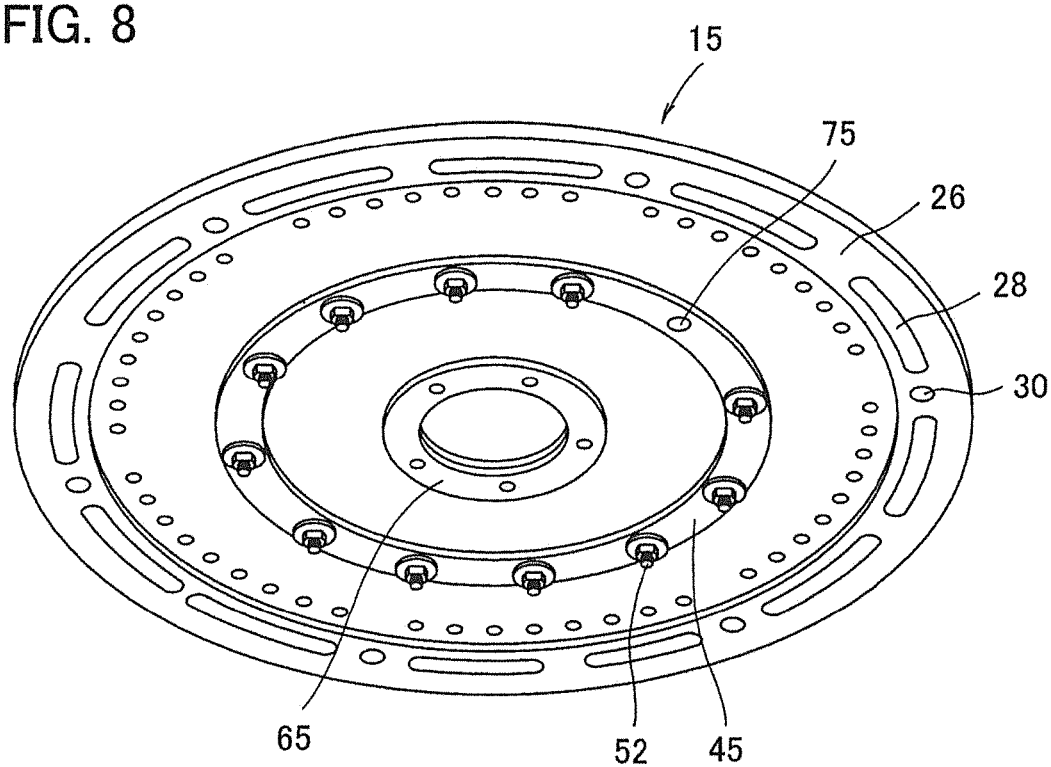
FIG. 8 is a perspective view of the deceleration mechanism unit of FIG. 4 as observed from the lower side.

The ring gear flange 26 has a circular contour shape, with a large opening 27 provided in the center. The opening 27 has a diameter smaller than the addendum circle diameter of the aforementioned ring gear 25. The ring gear flange 26 has step-like upper and lower portions in cross section as illustrated in FIGS. 5 and 7. More specifically, the ring gear flange 26 has an outer peripheral vicinity portion formed to be lower on the basis of a condition of use, the outer peripheral vicinity portion constituting an upper blade plate mounting portion 62. The upper blade plate mounting portion 62 has a plurality of long holes 28 and round holes 30 provided therein.

A region near the center of the ring gear flange 26 that is in the vicinity of the opening 27 is formed higher than the upper blade plate mounting portion 62 as described before. The region functions as a gear mounting surface 31. The gear mounting surface 31 has a large number of screw holes 63 provided therein. The ring gear 25 is integrally mounted on the gear mounting surface 31 of the ring gear flange 26 with un-illustrated screws and the like. A central axis of the ring gear 25 aligns with central axes of the ring gear flange 26 and the opening 27.

As described before, the opening 27 of the ring gear flange 26 has a diameter smaller than the addendum circle diameter of the ring gear 25. Accordingly, the end of the opening 27 of the ring gear flange 26 is inside the opening of the ring gear 25. Therefore, the end of the opening 27 of the ring gear flange 26 projects toward the opening side of the ring gear 25 as illustrated in FIG. 6. In the present embodiment, the projecting part functions as a ring gear-side guide 32 that moves as one piece with the ring gear 25.

When the ring gear-side member 20 is planarly viewed, the ring gear-side guide 32 is circular, and a line connecting an internal end 33 of the ring gear-side guide 32 forms a perfect circle. A pitch circle and the like of the ring gear 25 are concentric with a circle of the ring gear-side guide 32. The ring gear-side guide 32 is a circular opening formed in the ring gear flange 26, the circular opening having an arc-like portion (first arc-like portion) 38 provided on the inner periphery thereof.

A description is now given of the sun gear-side member 21. The sun gear-side member 21 includes a sun gear 35, a sun gear flange 36, and an auxiliary plate 65 as illustrated in FIG. 5. The sun gear 35 is a thin external gear. A module of the sun gear 35 is identical to that of the ring gear 25. The sun gear 35 has a circular contour shape, with a large opening 37 provided in the center. The sun gear 35 has a plate-like base material portion (second base material portion) 67, with a tooth portion (second tooth portion) 68 provided on an outer peripheral base end portion thereof. In the present embodiment, the base material portion 67 of the sun gear 35 is provided with a seal packing 70. The seal packing 70 is integrally fixed to the sun gear 35 with un-illustrated adhesive bonds and the like. The base material portion 67 of the sun gear 35 has holes 69 provided for fixing the sun gear 35. An auxiliary plate 65 is a circular plate having an opening 71 in the center, the circular plate having a plurality of mounting holes 72 provided thereon.

The number of teeth of the sun gear 35 is less than that of the ring gear 25 by about ten to about twenty four. The sun gear flange 36 has an external diameter smaller than the opening 27 of the ring gear flange 26. However, the external diameter of the sun gear flange 36 is larger than an addendum circle of the sun gear 35. The sun gear 35 is integrally mounted on the sun gear flange 36 and the auxiliary plate 65 with un-illustrated rivets and the like.

A central axis of the sun gear 35 is in accordance with a central axis of the sun gear flange 36. As described before, the external diameter of the sun gear flange 36 is larger than the addendum circle of the sun gear 35. Accordingly, the sun gear flange 36 has an outer peripheral edge projecting beyond the outer periphery of the sun gear 35. In the present embodiment, the projecting part functions as a sun gear-side guide 42 that moves as one piece with the sun gear 35. When the sun gear-side member 21 is planarly viewed, the sun gear-side guide 42 is circular, and a line connecting an outer peripheral edge 73 of the sun gear-side guide 42 forms a perfect circle. A pitch circle and the like of the sun gear 35 are concentric with a circle formed by connecting the outer peripheral edge 73 of the sun gear-side guide 42. The sun gear-side guide 42 is an outer periphery of a circular member, the outer periphery having an arc-like portion (second arc-like portion) 47.

Figure 10:
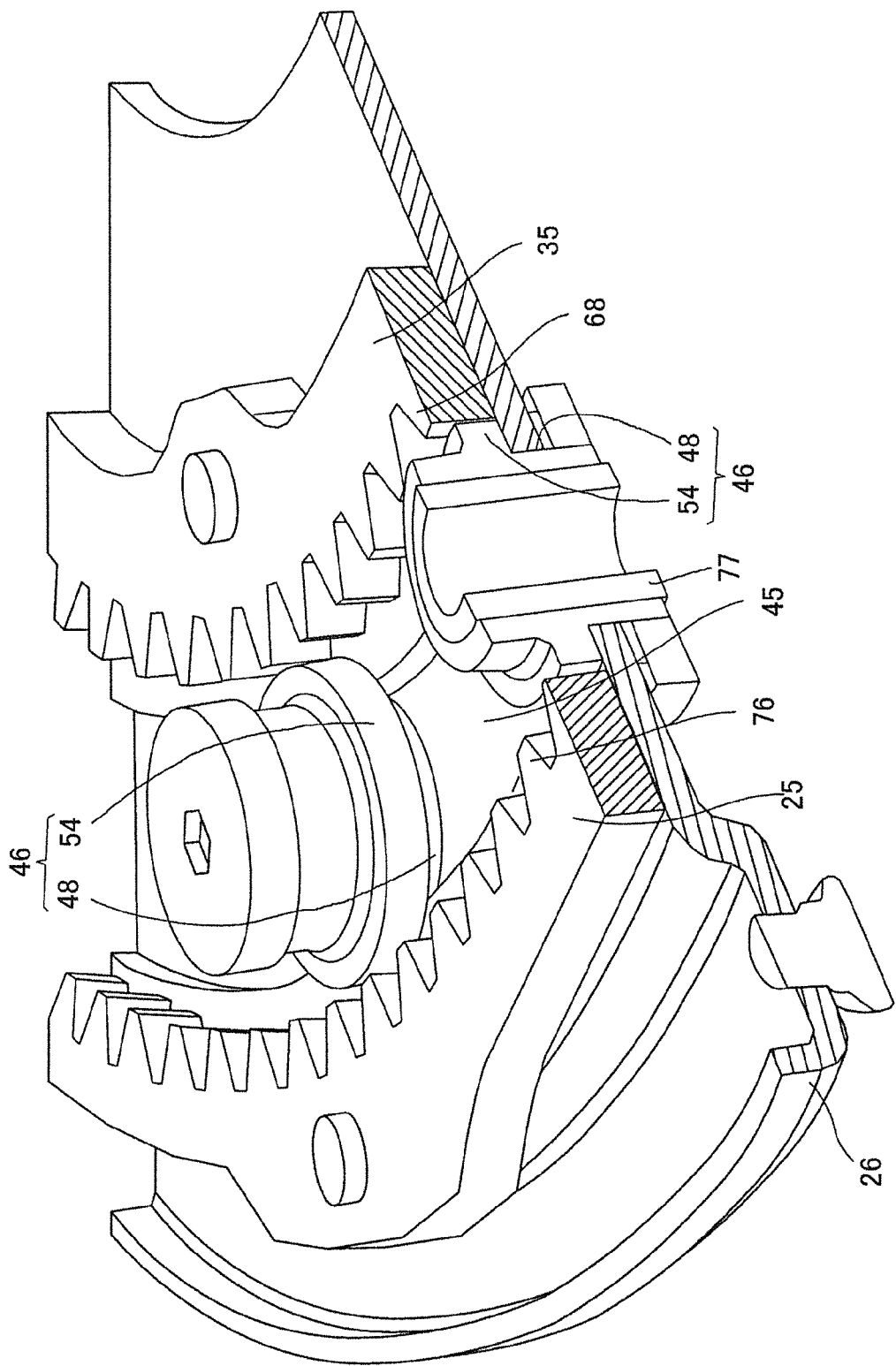
FIG. 10 is a perspective view of fragmentary expanded cross sections of the sun gear-side member, the ring gear-side member, and the retainer board member in the deceleration mechanism unit of FIG. 4 for illustrating the engagement relationship thereamong.

A description is now given of the retainer board member 22. The retainer board member 22 includes eleven rollers (rotors) 46 and one gear-holding hole 75 provided on a ring-shaped retainer board 45. The eleven rollers 46 and the one gear holding hole 75 are arranged at equal intervals on the same circumference. The rollers 46 each have an engagement portion 48 formed to have a small diameter. The rollers 46 also have locking flange portions 54a and 54b (FIGS. 6, 7, and 10) larger in diameter than the engagement portion 48, the locking flange portions 54a and 54b being provided on upper and lower sides of the engagement portion 48. The eleven rollers 46 are each mounted on the retainer board 45 so as to be freely rotatable. Out of the eleven rollers 46, five rollers 46 have through holes 98, into which later-described pins 52 of the upper cover member 13 are inserted. Each of the rollers 46 incorporates a bush 77.

Now, the small gear 23 will be described. The small gear 23 is a module identical to the modules of the ring gear 25 and the sun gear 35. The number of teeth of the small gear 23 is considerably smaller than that of the ring gear 25 and the sun gear 35. Specifically, the number of teeth of the small gear 23 is about five to ten. The small gear 23 is also larger in thickness (in height during use) direction than the ring gear 25 and the sun gear 35. The small gear 23 is twice or more thicker, preferably not less than three times and not more than four times thicker than the ring gear 25 and the sun gear 35. The small gear 23 has a through hole 41, which has a baffle portion (not illustrated), such as key grooves, formed thereon.

A description is now given of the positional relationship of each member of the deceleration mechanism unit 15. As describe before, the deceleration mechanism unit 15 includes the ring gear-side member 20, the sun gear-side member 21, the retainer board member 22, and the small gear 23. The ring gear-side member 20 and the sun gear-side member 21 are concentrically disposed on a substantially identical plane. That is, the ring gear 25 of the ring gear-side member 20 and the sun gear 35 of the sun gear-side member 21 are concentrically disposed on the identical plane. Specifically, the sun gear 35 is entirely settled in the opening 27 of the ring gear 25. A gap is present between the inner periphery of the ring gear 25 and the outer periphery of the sun gear 35.

The ring gear-side guide 32 of the ring gear-side member 20 and the sun gear-side guide 42 at the side of the sun gear-side member 21 are concentrically disposed on an identical plane. Specifically, the sun gear-side guide 42 is entirely settled in the opening 27 of the ring gear-side guide 32. A gap is present between the ring gear-side guide 32 and the sun gear-side guide 42.

The retainer board member 22 is disposed under the ring gear-side member 20 and the sun gear-side member 21. The eleven rollers 46 mounted on the retainer board member 22 are each provided in a gap between the ring gear-side guide 32 and the sun gear-side guide 42, and the engagement portions 48 of the rollers 46 are in contact with both the ring gear-side guide 32 and the sun gear-side guide 42. In short, in the present embodiment, the ring gear-side guide 32 and the sun gear-side guide 42 are engaged through the rollers 46. Accordingly, the relative positions of the ring gear-side member 20 and the sun gear-side member 21 are determined by engagement between the ring gear-side guide 32 and the sun gear-side guide 42. This prevents deviation of the relative positions of the ring gear-side member 20 and the sun gear-side member 21.

The small gear 23 is disposed in a gap between the inner periphery of the ring gear 25 and the outer periphery of the sun gear 35. The small gear 23 engages with both the ring gear 25 and the sun gear 35. One end of the small gear 23 is rotatably supported by the gear holding hole 75 of the retainer board member 22. In the present embodiment, the small gear 23 is provided around the sun gear 35, and the ring gear 25 is provided in the outer periphery of the small gear 23. This configuration forms a kind of planetary gear train.

The deceleration mechanism unit 15 is interposed between the upper-side intermediate plate member 12 and the lower-side intermediate plate member 14. The upper cover member 13 and the lower cover member 17 are further attached above the upper-side intermediate plate member 12 and below the lower-side intermediate plate member 14, respectively.

Figure 11:
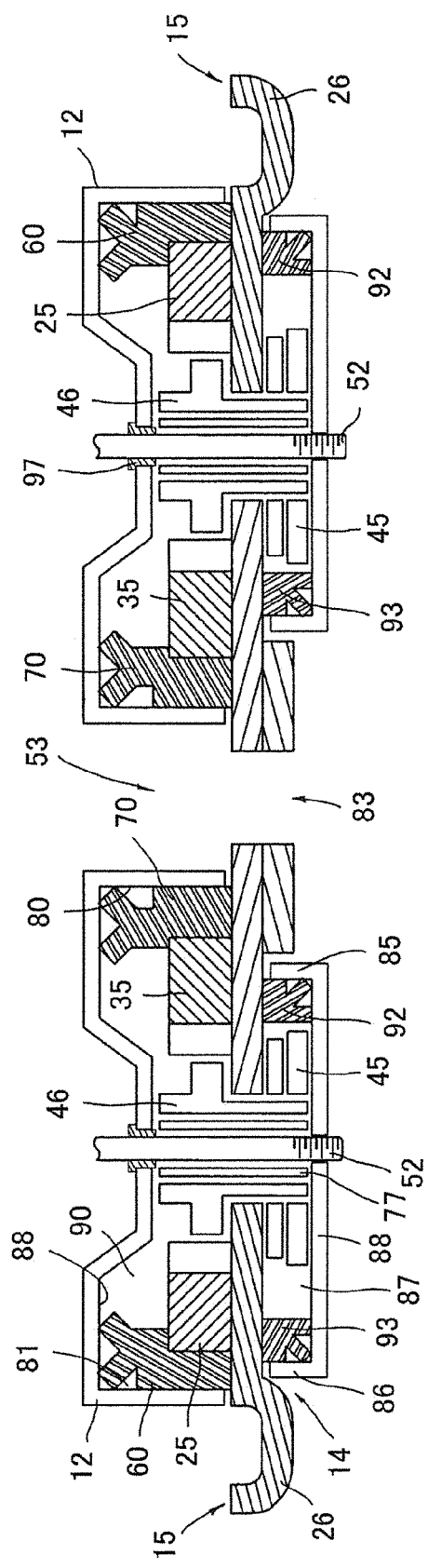
FIG. 11 is a cross sectional view of the deceleration mechanism unit of FIG. 4 with upper and lower intermediate plate members being attached thereto.

The upper-side intermediate plate member 12 is a disc-like member, with an opening 53 being provided at a position corresponding to the opening 50 of the upper cover member 13. The upper-side intermediate plate member 12 has an opening 53 in the center as illustrated in FIG. 4. As illustrated in FIG. 11, vertical walls 80 and 81 are provided around the opening 53 and in its outer peripheral portion, respectively. A region 90 surrounded with the vertical walls 80 and 81 annularly surrounds the opening 53. The region 90 surrounded with the vertical walls 80 and 81 functions as a gear housing portion. The upper-side intermediate plate member 12 has eleven holes 91.

The lower-side intermediate plate member 14 has a bottom surface (that is a top surface-side based on an assembled posture) 88, and an opening 83 in the center of the bottom surface. The opening 83 has an opening end and an outer peripheral portion, which are provided with vertical walls 85 and 86. In the present embodiment, the bottom surface 88 functions as an axial engagement portion, and the vertical walls 85 and 86 function as a radial engagement portion. A region 87 surrounded with the vertical walls (radial engagement portions) 85 and 86 functions as a seal housing portion.

In the present embodiment, the deceleration mechanism unit 15 is interposed between the upper-side intermediate plate member 12 and the lower-side intermediate plate member 14 as described before. The region 90 (gear housing portion) of the upper-side intermediate plate member 12 surrounded with the vertical walls 80 and 81 covers the ring gear 25 and the sun gear 35. The region 90 (gear housing portion) surrounded with the vertical walls 80 and 81 houses grease which is not illustrated.

In the present embodiment, the seal packing 60 provided integrally with the ring gear 25 is in contact with the bottom surface (axial engagement portion) 88 of the upper-side intermediate plate member 12 and the vertical wall (radial engagement portion) 81 of the outer peripheral side. The seal packing 70 provided integrally with the sun gear 35 is partially in contact with the bottom surface (axial engagement portion) 88 of the upper-side intermediate plate member 12 and the vertical wall (radial engagement portion) 80 around the opening.

In the present embodiment, the seal packing 60 provided integrally with the ring gear 25 that is an external gear is in contact with the bottom surface 88 of the upper-side intermediate plate member 12, while the seal packing 70 provided integrally with the sun gear 35 that is an internal gear is also in contact with the bottom surface 88 of the upper-side intermediate plate member 12. Accordingly, the region 90 (gear housing portion) surrounded with the vertical walls 80 and 81 is in a sealed state, thus constituting a water sealing structure.

In the present embodiment, the seal packing 60 provided integrally with the ring gear 25 that is an external is in contact with the vertical wall (radial engagement portion) 81 on the outer peripheral side of the upper-side intermediate plate member 12. Here, the seal packing 60 is provided integrally with the ring gear 25 so as to surround the outer periphery of the ring gear 25. The seal packing 60 is in contact with the outer peripheral-side vertical wall (radial engagement portion) 81 standing in an axial direction of the ring gear 25, and engages with the vertical wall 81 to prevent the ring gear 25 from moving in the radial direction. That is, the seal packing 60 engages with the vertical wall (radial engagement portion) 81 so as to resist the force acting upon the ring gear 25 in the radial direction.

In the present embodiment, the seal packing 60 is in contact with both the upper surface of the ring gear 25 and the bottom surface (axial engagement portion) 88 of the upper-side intermediate plate member 12. Accordingly, the seal packing 60 also has a function of resisting the force acting upon the ring gear 25 in the axial direction (thrust direction). Therefore, the seal packing 60 engages with the bottom surface (axial engagement portion) 88 of the upper-side intermediate plate member 12 so as to resist the force acting upon the ring gear 25 in the axial direction (thrust direction).

Similarly, the seal packing 70 provided integrally with the sun gear 35 that is an internal gear is also in contact with the vertical wall 80 around the opening of the upper-side intermediate plate member 12. Here, the seal packing 70 is provided integrally with the sun gear 35 so as to surround the inner periphery of the sun gear 35. The seal packing 70 is in contact with the vertical wall (radial engagement portion) 80 around the opening, the vertical wall 80 standing in the axial direction of the sun gear 35. The seal packing 70 engages with the vertical wall 80 to prevent the sun gear 35 from moving in the radial direction. That is, the seal packing 70 engages with the vertical wall (radial engagement portion) 80 so as to resist the force acting upon the sun gear 35 in the radial direction. In the present embodiment, the seal packing 70 is in contact with both the upper surface of the sun gear 35 and the bottom surface (axial engagement portion) 88 of the upper-side intermediate plate member 12. Accordingly, the seal packing 70 also has a function of resisting the force acting upon the sun gear 35 in the axial direction (thrust direction). Therefore, the seal packing 70 engages with the bottom surface (axial engagement portion) 88 of the upper-side intermediate plate member 12 so as to resist the force acting upon the sun gear 35 in the axial direction (thrust direction).

In the present embodiment, the region 87 surrounded with the vertical walls 85 and 86 is also provided with seal packings 92 and 93, and therefore the region 87 surrounded with the vertical walls 85 and 86 is also in a sealed state, thus constituting a water sealing structure. The region 87 surrounded with the vertical walls 85 and 86 houses grease which is not illustrated.

Figure 9:
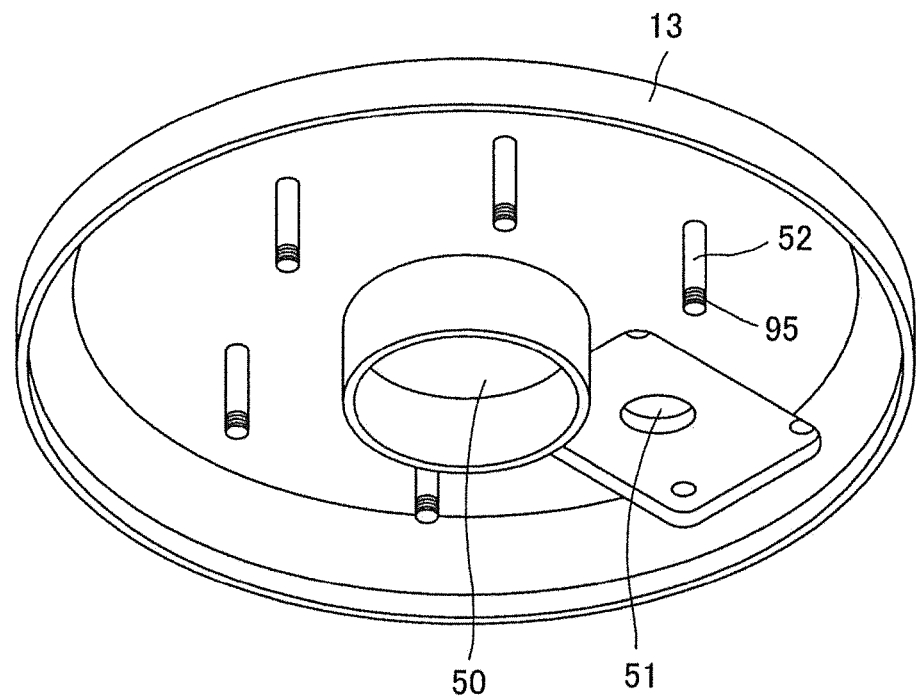
FIG. 9 is a perspective view of the upper cover member of the body unit of the grass cutter of FIG. 1 as observed from the lower side.

As illustrated in FIG. 4, the upper cover member 13 is a thin tray-like member. The upper cover member 13 has an opening 51 provided in a part near the outer periphery thereof. The upper cover member 13 also has an opening 50 in the center thereof. Five pins 52 project from an inner surface of the upper cover member 13 as illustrated in FIG. 9. The pins 52 are rotatable relative to the upper cover member 13, and each of the pins 52 has a screw 95 formed at the top end thereof. The upper cover member 13 is integrally fixed to the handle 3, so that the upper cover member 13 does not move relative to the handle 3.

The lower cover member 17 is a member molded into a bowl shape, with a lower blade mounting portion 61 being formed in the vicinity of an opening. The lower blade mounting portion 61 has a flange shape, with five projections 55 provided in plane view. Each of the projections 55 has a mounting hole 56 provided thereon.

The lower cover member 17 has a raised portion 57 in the central portion thereof. The top of the raised portion 57 has a ring shape in plane view. The raised portion 57 functions as a connection portion connected to the deceleration mechanism unit 15. The raised portion 57 has long holes 58 provided at equal intervals on the same circumference. The long hole 58 has a region having a large width formed in the center thereof.

In the present embodiment, as described in the foregoing, the deceleration mechanism unit 15 is covered with the upper-side intermediate plate member 12, and the upper-side intermediate plate member 12 is further covered with the upper cover member 13. A packing 96 is placed between the vicinity of the opening 50 of the upper cover member 13 and the vicinity of the opening 53 of the upper-side intermediate plate member 12. The pins 52 provided in the upper cover member 13 go through the holes 91 of the upper-side intermediate plate member 12, and are inserted into the through holes 98 of the five rollers 46 of the deceleration mechanism unit 15. Therefore, the centers of the five rollers 46 are unmovable with respect to the upper cover member 13. Moreover, the retainer board 45 with the five rollers 46 mounted thereon is unmovable with respect to the upper cover member 13. Accordingly, the central axes of other rollers 46 mounted on the upper cover member 13 and the small gear 23 are unmovable with respect to the upper cover member 13. Therefore, the rollers and the small gear 23 each rotate at fixed positions and have unmovable rotation positions. That is, the rollers 46 and the small gear 23 rotate only at the same positions, and do not revolve around the sun gear 35 or the sun gear-side guide 42.

The top ends of the pins 52 provided on the upper cover member 13 reach the retainer board 45, and the screws 95 provided at the top end of the pins 52 engage with un-illustrated screw holes provided in the retainer board 45. A packing 97 is interposed between the holes 91 of the upper-side intermediate plate member 12 and the pins 52 to prevent water and the like from entering and moving through the holes 91.

In the present embodiment, the lower cover member 17 covers the lower surface of the deceleration mechanism unit 15. The sun gear-side member 21 is integrally mounted on the lower cover member 17. Specifically, the sun gear flange 36 of the sun gear-side member 21 is in contact with the raised portion 57 of the lower cover member 17, and they are coupled via un-illustrated screws and the like. Accordingly, in the present embodiment, the lower cover member 17 rotates together with the sun gear-side member 21.

In the present embodiment, the upper blade plate 10 is mounted on the upper blade plate mounting portion 62 of the ring gear flange 26 of the deceleration mechanism unit 15. Since the ring gear flange 26 integrally rotates with the ring gear 25, the upper blade plate 10 integrally rotates with the ring gear 25. The lower blade plate 11 is mounted on the lower blade mounting portion 61 of the lower cover member 17. Since the lower cover member 17 rotates together with the sun gear-side member 21, the lower blade plate 11 rotates integrally with the sun gear 35.

In the grass cutter 1 of the present embodiment, the body unit 2 is mounted on the top end of the handle 3, an un-illustrated drive shaft inserted into the handle 3 is inserted into the through hole 41 of the small gear 23, and an un-illustrated engagement portion of the drive shaft engages with a baffle portion (not illustrated) in the through hole 41.

A description is now given of the function of the grass cutter 1 of the present embodiment. The grass cutter 1 of the present embodiment is used by starting the power source 5, such as a motor and an engine, mounted on the back end of the handle 3 as in the case of publicly known grass cutters. The turning effect of the power source 5 is transmitted to the small gear 23 via an un-illustrated drive shaft, and the small gear 23 is rotated thereby. Here, the small gear 23 engages with both the ring gear 25 and the sun gear 35. Accordingly, three components including the small gear 23, the ring gear 25, and the sun gear 35 constitute a kind of planetary gear train. However, in the present embodiment, the retainer board 45 configured to retain the small gear 23 does not revolve, and so the small gear 23 rotates in the state of staying at a fixed position. As a result, both the sun gear 35 that is internally engaged and the ring gear 25 that is externally engaged receive the turning effect from the small gear 23 and rotate thereby. Here, since the sun gear 35 is an external gear and the ring gear 25 is an internal gear, the sun gear 35 and the ring gear 25 rotate in relatively opposite directions when the small gear 23 in engagement with both the gears rotates. When the sun gear 35 and the ring gear 25 rotate in relatively opposite directions, the upper blade plate 10 and the lower blade plate 11 rotate in relatively opposite directions. Therefore, it becomes possible to catch plants between the cutting blades of the upper blade plate 10 and the lower blade plate 11 and to cut the plants with the cutting blades.

Since the three components including the small gear 23, the ring gear 25, and the sun gear 35 constitute a kind of planetary gear train as described before, the turning effect of the power source 5 is decelerated by a substantial degree, so that the upper blade plate 10 and the lower blade plate 11 relatively rotate at slow speed. Therefore, the grass cutter 1 of the present embodiment has high safety. The grass cutter 1 of the present embodiment transmits the turning effect of the power source 5 to the small gear 23, and the small gear 23 as a driving gear drives other gears such as the ring gear 25 and the sun gear 35. Since the deceleration mechanism unit 15 of the grass cutter 1 of the present embodiment is a deceleration mechanism which constitutes a kind of planetary gear train, the small gear 23 as a driving gear is at a position offset from the center of the planetary gear train. Accordingly, in the grass cutter 1 of the present embodiment, the handle 3 that delivers the power to the small gear 23 is mounted at a position away from the center of the body unit 2. Therefore, in the grass cutter 1 of the present embodiment, grasses cut by grass cutting operation are less likely to coil around the handle 3 or a joint between the handle 3 and the body unit 2.

Also in the grass cutter 1 of the present embodiment, the small gear 23, the ring gear 25, and the sun gear 35 are worn out if the grass cutter 1 is used over a long period of time. However, in the present embodiment, the relative positional relationship among the small gear 23, the ring gear 25, and the sun gear 35 is fixed not by engagement between the gears but by the engagement between the ring gear-side guide 32 and the sun gear-side guide 42. Accordingly, even when the small gear 23, the ring gear 25, and the sun gear 35 are worn out and their engagement clearance changes, the relative positional relationship among the small gear 23, the ring gear 25, and the sun gear 35 is unchanged. Accordingly, the small gear 23, the ring gear 25, and the sun gear 35 are free from backlash and therefore their normal engagement relationship is continuously maintained.

In the present embodiment, the seal packings 60 and 70 also engage with part of the upper-side intermediate plate member 12 to prevent the ring gear 25 and the sun gear 35 from moving in the radial direction. Therefore, the seal packings 60 and 70 also contribute to the effect of maintaining the positional relationship between the ring gear 25 and the sun gear 35.

When used over a long period of time, the small gear 23 is significantly worn out compared with other gears. In this case, the handle 3 is dismounted from the body unit 2, and the opening of the body unit 2 is exposed. Through the exposed opening, the small gear 23 is taken out and is turned upside down. Then the small gear 23 is inserted again into the opening and is re-engaged with the ring gear 25 and the sun gear 35. Since the small gear 23 is thicker than the ring gear 25 and the sun gear 35 as described before, a region of the small gear 23 which engages with the ring gear 25 and the sun gear 35 is only part of a distal-end side of the overall length of the small gear 23. Accordingly, although the distal-end side of the small gear 23 is worn out, an opposite side is intact. Therefore, if the small gear 23 is taken out, turned upside down, and is inserted again, a portion of the small gear 23 having a normal tooth form engages with the ring gear 25 and the sun gear 35, so that normal engagement relationship is reconstructed.

In the embodiments described in the foregoing, the rollers are interposed between the sun gear-side guide and the ring gear-side guide so as to engage the sun gear-side guide and the ring gear-side guide through the rollers. However, the sun gear-side guide and the ring gear-side guide may directly be engaged.

In the embodiments described in the foregoing, the upper blade plate 10 is rotated by the ring gear 25, and the lower blade plate 11 is rotated by the sun gear 35. However, it is also possible to configure the grass cutter so that the upper blade plate 10 is rotated by the sun gear 35 and the lower blade plate 11 is rotated by the ring gear 25 in a converse manner. Furthermore, one of the upper blade plate 10 and the lower blade plate 11 may be used as a stationary blade, and only the other plate may be rotated.

The invention claimed is:

1. A grass cutter comprising:
    two or more coaxially disposed blade plates each having a plurality of cutting blades projecting from an outer peripheral portion thereof;
    a power source; and
    a deceleration mechanism that decelerates power of the power source to rotate at least one of the blade plates to catch plants between the cutting blades of the two blade plates and to cut the plants with the cutting blades,
    wherein the deceleration mechanism comprises:
        a sun gear-side member;
        a ring gear-side member;
        and at least one small gear,
        the sun gear-side member comprising:
            a sun gear with a gear formed on an outer peripheral portion thereof; and
            a sun gear-side guide provided with the sun gear,
        the ring gear-side member comprising:
            a ring gear with a gear formed on an inner peripheral side thereof; and
            a ring gear-side guide provided coaxially with the ring gear,
    wherein the sun gear-side guide provided with the ring gear-side guide directly or through another member so as to prevent the sun gear and the ring gear from relatively moving in a radial direction, and
    wherein the at least one small gear is present between the sun gear and the ring gear, the at least one small gear engaging with both of the sun gear and the ring gear to receive the power of the power source transmitted thereto,
    wherein the ring gear-side guide is a circular opening formed in a member, the circular opening having a first arc-like portion provided on an inner periphery thereof,
    wherein the sun gear-side guide is an outer periphery of a circular member, the outer periphery having a second arc-like portion,
    wherein the first arc-like portion has an inner diameter larger than an external diameter of the second arc-like portion,
    wherein the sun gear-side guide is inside the ring gear-side guide, with the second arc-like portion being disposed concentrically with the first arc-like portion, and
    wherein the first arc-like portion and the second arc-like portion are provided with a roller interposed therebetween.

2. The grass cutter according to claim 1, further comprising a plate-shaped or ring-shaped retainer board,
    wherein a plurality of the rollers and the at least one small gear are rotatably supported by or mounted on the retainer board.

3. The grass cutter according to claim 1, further comprising:
    a handle; and
    a body unit comprising the blade plates and the deceleration mechanism,
    the body unit further comprising:
        a plate-shaped or ring-shaped retainer board; and
        an unmovable member unmovable relative to the handle,
    wherein a plurality of the rollers each having a through hole are provided between the sun gear-side guide and the ring gear-side guide,
    wherein a plurality of pins are inserted between the unmovable member and the retainer board, and
    wherein the rollers are rotatably supported by or mounted on the retainer board while the pins are inserted into the through holes of the rollers.

4. The grass cutter according to claim 1,
    wherein both of the sun gear and the ring gear are plate-shaped,
    wherein the small gear receiving the power of the power source transmitted thereto has a thickness more than twice as large as those of the sun gear and the ring gear,
    wherein only a region near axial one end of the small gear engages with the sun gear and the ring gear when the small gear engages with the sun gear and the ring gear, and
    wherein top and bottom sides of the small gear are reversible and the region of the small gear engaging with the sun gear and the ring gear is changeable by reversing the top and bottom sides of the small gear according to the necessity.

5. The grass cutter according to claim 1,
    wherein the ring gear comprises a first base material portion and a first tooth portion provided on an inner peripheral side of the first base material portion whereas the sun gear comprises a second base material portion and a second tooth portion provided on an outer peripheral side of the second base material portion, wherein at least one of the first base material portion of the ring gear and the second base material portion of the sun gear has a seal packing, the seal packing being integrally fixed at least in a radial direction of the ring gear and/or sun gear having the base material portion with the seal packing, wherein part of the seal packing is in contact with a second another member to constitute a water sealing structure, the second another member having an engagement portion, and wherein the seal packing engages with the engagement portion of the second another member so as to be able to support a radial direction load of the sun gear and/or the ring gear.

6. The grass cutter according to claim 1,
wherein the ring gear comprises a first base material portion and a first tooth portion provided on an inner peripheral side of the first base material portion whereas the sun gear comprises a second base material portion and a second tooth portion provided on an outer peripheral side of the second base material portion, wherein at least one of a plate-shaped part of the sun gear and a plate-shaped part of the ring gear has a seal packing, the seal packing being integrally fixed at least in an axial direction of the sun gear and/or ring gear having the plate-shaped part with the seal packing, wherein part of the seal packing is in contact with a second another member to constitute a water sealing structure, the second another member having an engagement portion, and wherein the seal packing engages with the engagement portion of the second another member so as to be able to support a thrust direction load of the sun gear and/or the ring gear.

7. A grass cutter comprising:
two or more coaxially disposed blade plates each having a plurality of cutting blades projecting from an outer peripheral portion thereof;
a power source; and
a deceleration mechanism that decelerates power of the power source to rotate at least one of the blade plates to catch plants between the cutting blades of the two blade plates and to cut the plants with the cutting blade,
wherein the deceleration mechanism comprises:
   a sun gear-side member;
   a ring gear-side member;
   and at least one small gear,
   the sun gear-side member comprising:
     a sun gear with a gear formed on an outer peripheral portion thereof; and
     a sun gear-side guide provided coaxially with the sun gear,
   the ring gear-side member comprising:
     a ring gear with a gear formed on an inner peripheral side thereof; and
     a ring gear-side guide provided coaxially with the ring gear,
wherein the sun gear-side guide engages with the ring gear-side guide directly or through another member so as to prevent the sun gear and the ring gear from relatively moving in a radial direction, and
wherein the at least one small gear is present between the sun gear and the ring gear, the at least one small gear engaging with both of the sun gear and the ring gear to receive the power of the power source transmitted thereto, wherein both of the sun gear and the ring gear are plate-shaped,
wherein the small gear receiving the power of the power source transmitted thereto has a thickness more than twice as large as those of the sun gear and the ring gear,
wherein only a region near axial one end of the small gear engages with the sun gear and the ring gear when the small gear engages with the sun gear and the ring gear, and
wherein top and bottom sides of the small gear are reversible and the region of the small gear engaging with the sun gear and the ring gear is changeable by reversing the top and bottom sides of the small gear according to the necessity.

8. A grass cutter, comprising:
two or more coaxially disposed blade plates each having a plurality of cutting blades projecting from an outer peripheral portion thereof;
a power source; and
a deceleration mechanism that decelerates power of the power source to rotate at least one of the blade plates to catch plants between the cutting blades of the two blade plates and to cut the plants with the cutting blades,
wherein the deceleration mechanism comprises:
   a sun gear-side member;
   a ring gear-side member;
   and at least one small gear,
   the sun gear-side member comprising:
     a sun gear with a gear formed on an outer peripheral portion thereof; and
     a sun gear-side guide provided coaxially with the sun gear and movable as one piece with the sun gear,
   the ring gear-side member comprising:
     a ring gear with a gear formed on an inner peripheral side thereof; and
     a ring gear-side guide provided coaxially with the ring gear and movable as one piece with the ring gear,
wherein the sun gear-side guide engages with the ring gear-side guide directly or through a first another member so as to prevent the sun gear and the ring gear from relatively moving in a radial direction, and
wherein the at least one small gear is present between the sun gear and the ring gear, the at least one small gear engaging with both of the sun gear and the ring gear to receive the power of the power source transmitted thereto.

9. The grass cutter according to claim 1,
wherein the ring gear-side guide is a circular opening formed in a member, the circular opening having an inner diameter smaller than an addendum circle diameter of the ring gear,
wherein the sun gear-side guide is an outer periphery of a circular member, the outer periphery having an external diameter larger than the sun gear, and
wherein the sun gear-side guide and the ring gear-side guide are provided with a rotor interposed therebetween.

10. The grass cutter according to claim 9, further comprising a plate-shaped or ring-shaped retainer board,
wherein a plurality of the rotors and the at least one small gear are rotatably supported by or mounted on the retainer board.

11. The grass cutter according to claim 9, further comprising:
a handle; and
a body unit comprising the blade plates and the deceleration mechanism,
the body unit further comprising:
a plate-shaped or ring-shaped retainer board; and
an unmovable member unmovable relative to the handle,
wherein a plurality of the rotors each having a through hole are provided between the sun gear-side guide and the ring gear-side guide,
wherein a plurality of pins are inserted between the unmovable member and the retainer board, and
wherein the rotors are rotatably supported by or mounted on the retainer board while the pins are inserted into the through holes of the rotors.

12. The grass cutter according to claim 9,
wherein both of the sun gear and the ring gear are plate-shaped,
wherein the small gear receiving the power of the power source transmitted thereto has a thickness more than twice as large as those of the sun gear and the ring gear,
wherein only a region near axial one end of the small gear engages with the sun gear and the ring gear when the small gear engages with the sun gear and the ring gear, and
wherein top and bottom sides of the small gear are reversible and the region of the small gear engaging with the sun gear and the ring gear is changeable by reversing the top and bottom sides of the small gear according to the necessity.

13. The grass cutter according to claim 9,
wherein the ring gear comprises a first base material portion and a first tooth portion provided on an inner peripheral side of the first base material portion whereas the sun gear comprises a second base material portion and a second tooth portion provided on an outer peripheral side of the second base material portion,
wherein at least one of the first base material portion of the ring gear and the second base material portion of the sun gear has a seal packing, the seal packing being integrally fixed at least in a radial direction of the ring gear and/or sun gear having the base material portion with the seal packing,
wherein part of the seal packing is in contact with a second another member to constitute a water sealing structure, the second another member having an engagement portion, and
wherein the seal packing engages with the engagement portion of the second another member so as to be able to support a radial direction load of the sun gear and/or the ring gear.

14. The grass cutter according to claim 9,
wherein the ring gear comprises a first base material portion and a first tooth portion provided on an inner peripheral side of the first base material portion whereas the sun gear comprises a second base material portion and a second tooth portion provided on an outer peripheral side of the second base material portion,
wherein at least one of a plate-shaped part of the sun gear and a plate-shaped part of the ring gear has a seal packing, the seal packing being integrally fixed at least in an axial direction of the sun gear and/or ring gear having the plate-shaped part with the seal packing,
wherein part of the seal packing is in contact with a second another member to constitute a water sealing structure, the second another member having an engagement portion, and
wherein the seal packing engages with the engagement portion of the second another member so as to be able to support a thrust direction load of the sun gear and/or the ring gear.

15. The grass cutter according to claim 1, further comprising a plate-shaped or ring-shaped retainer board,
wherein a plurality of rollers are provided between the sun gear-side guide and the ring gear-side guide, and
wherein the plurality of rollers and the at least one small gear are rotatably supported by or mounted on the retainer board.

16. The grass cutter according to claim 1, further comprising:
a handle; and
a body unit comprising the blade plates and the deceleration mechanism,
the body unit further comprising:
a plate-shaped or ring-shaped retainer board; and
an unmovable member unmovable relative to the handle,
wherein a plurality of rollers each having a through hole are provided between the sun gear-side guide and the ring gear-side guide,
wherein a plurality of pins are inserted between the unmovable member and the retainer board, and
wherein the rollers are rotatably supported by or mounted on the retainer board while the pins are inserted into the through holes of the rollers.

17. The grass cutter according to claim 1,
wherein the ring gear comprises a first base material portion and a first tooth portion provided on an inner peripheral side of the first base material portion whereas the sun gear comprises a second base material portion and a second tooth portion provided on an outer peripheral side of the second base material portion,
wherein at least one of the first base material portion of the ring gear and the second base material portion of the sun gear has a seal packing, the seal packing being integrally fixed at least in a radial direction of the ring gear and/or sun gear having the base material portion with the seal packing,
wherein part of the seal packing is in contact with a second another member to constitute a water sealing structure, the second another member having an engagement portion, and
wherein the seal packing engages with the engagement portion of the second another member so as to be able to support a radial direction load of the sun gear and/or the ring gear.

18. The grass cutter according to claim 1,
wherein the ring gear comprises a first base material portion and a first tooth portion provided on an inner peripheral side of the first base material portion whereas the sun gear comprises a second base material portion and a second tooth portion provided on an outer peripheral side of the second base material portion,
wherein at least one of a plate-shaped part of the sun gear and a plate-shaped part of the ring gear has a seal packing, the seal packing being integrally fixed at least in an axial direction of the sun gear and/or ring gear having the plate-shaped part with the seal packing, wherein part of the seal packing is in contact with a second another member to constitute a water sealing structure, the second another member having an engagement portion, and wherein the seal packing engages with the engagement portion of the second another member so as to be able to support a thrust direction load of the sun gear and/or the ring gear.

* * * * *

UNITED STATES PATENT AND TRADEMARK OFFICE
CERTIFICATE OF CORRECTION

PATENT NO. : 9,750,182 B2
APPLICATION NO. : 14/970776
DATED : September 5, 2017
INVENTOR(S) : Itoh et al.

It is certified that error appears in the above-identified patent and that said Letters Patent is hereby corrected as shown below:

In the Claims

Column 13, Line 43-Column 14, Line 23 (approx.) should read:
1. A grass cutter comprising:
two or more coaxially disposed blade plates each having a plurality of cutting blades projecting from
 an outer peripheral portion thereof;
a power source; and
a deceleration mechanism that decelerates power of the power source to rotate at least one of the
 blade plates to catch plants between the cutting blades of the two blade plates and to cut the
 plants with the cutting blades,
wherein the deceleration mechanism comprises:
 a sun gear-side member;
 a ring gear-side member;
 and at least one small gear,
 the sun gear-side member comprising:
  a sun gear with a gear formed on an outer peripheral portion thereof; and
  a sun gear-side guide provided coaxially with the sun gear,
 the ring gear-side member comprising:
  a ring gear with a gear formed on an inner peripheral side thereof; and
  a ring gear-side guide provided coaxially with the ring gear,
wherein the sun gear-side guide engages with the ring gear-side guide directly or through another
 member so as to prevent the sun gear and the ring gear from relatively moving in a radial
 direction, and
wherein the at least one small gear is present between the sun gear and the ring gear, the at least one
 small gear engaging with both of the sun gear and the ring gear to receive the power of the
 power source transmitted thereto,
wherein the ring gear-side guide is a circular opening formed in a member, the circular opening
 having a first arc-like portion provided on an inner periphery thereof,
wherein the sun gear-side guide is an outer periphery of a circular member, the outer periphery
 having a second arc-like portion, Signed and Sealed this
Eleventh Day of September, 2018

Andrei Iancu
*Director of the United States Patent and Trademark Office* wherein the first arc-like portion has an inner diameter larger than an external diameter of the second arc-like portion,
wherein the sun gear-side guide is inside the ring gear-side guide, with the second arc-like portion being disposed concentrically with the first arc-like portion, and
wherein the first arc-like portion and the second arc-like portion are provided with a roller interposed therebetween.

Column 16, Line 49-59 (approx.) should read:
9. The grass cutter according to claim 8,
wherein the ring gear-side guide is a circular opening formed in a member, the circular opening having an inner diameter smaller than an addendum circle diameter of the ring gear,
wherein the sun gear-side guide is an outer periphery of a circular member, the outer periphery having an external diameter larger than the sun gear, and
wherein the sun gear-side guide and the ring gear-side guide are provided with a rotor interposed therebetween.

Column 18, Line 9-15 (approx.) should read:
15. The grass cutter according to claim 8, further comprising a plate-shaped or ring-shaped retainer board,
wherein a plurality of rollers are provided between the sun gear-side guide and the ring gear-side guide, and
wherein the plurality of rollers and the at least one small gear are rotatably supported by or mounted on the retainer board.

Column 18, Line 16-32 (approx.) should read:
16. The grass cutter according to claim 8, further comprising:
a handle; and
a body unit comprising the blade plates and the deceleration mechanism,
the body unit further comprising:
    a plate-shaped or ring-shaped retainer board; and
    an unmovable member unmovable relative to the handle,
wherein a plurality of rollers each having a through hole are provided between the sun gear-side guide and the ring gear-side guide,
wherein a plurality of pins are inserted between the unmovable member and the retainer board, and
wherein the rollers are rotatably supported by or mounted on the retainer board while the pins are inserted into the through holes of the rollers.

Column 18, Line 33-53 (approx.) should read:
17. The grass cutter according to claim 8,
wherein the ring gear comprises a first base material portion and a first tooth portion provided on an inner peripheral side of the first base material portion whereas the sun gear comprises a second base material portion and a second tooth portion provided on an outer peripheral side of the second base material portion,
wherein at least one of the first base material portion of the ring gear and the second base material portion of the sun gear has a seal packing, the seal packing being integrally fixed at least in a radial direction of the ring gear and/or sun gear having the base material portion with the seal packing,
wherein part of the seal packing is in contact with a second another member to constitute a water sealing structure, the second another member having an engagement portion, and
wherein the seal packing engages with the engagement portion of the another member so as to be able to support a radial direction load of the sun gear and/or the ring gear.

Column 18, Line 54-Column 19, Line 8 (approx.) should read:
18. The grass cutter according to claim 8,
wherein the ring gear comprises a first base material portion and a first tooth portion provided on an inner peripheral side of the first base material portion whereas the sun gear comprises a second base material portion and a second tooth portion provided on an outer peripheral side of the second base material portion,
wherein at least one of a plate-shaped part of the sun gear and a plate-shaped part of the ring gear has a seal packing, the seal packing being integrally fixed at least in an axial direction of the sun gear and/or ring gear having the plate-shaped part with the seal packing,
wherein part of the seal packing is in contact with a second another member to constitute a water sealing structure, the second another member having an engagement portion, and
wherein the seal packing engages with the engagement portion of the second another member so as to be able to support a thrust direction load of the sun gear and/or the ring gear.